John H. Lindau
Robert P. Stewart
John D. Black
INVENTORS.

BY
ATTORNEY.

Patented Sept. 30, 1952

2,612,018

UNITED STATES PATENT OFFICE 2,612,018

HYDRAULIC LIFT FOR CUTTER BARS

John H. Lindau, Kansas City, Mo., and Robert P. Stewart and John D. Black, Wilmore, Kans.

Application May 23, 1949, Serial No. 94,764

1 Claim. (Cl. 56—208)

This invention relates to the field of farm implements and particularly combines and the like having as a part thereof cutter bar assemblies mounted for vertical reciprocal movement, the primary object being to provide novel raising and lowering mechanism for such cutter bar that is extremely fast and dependable in operation.

The most important object of the present invention is to provide elevating and lowering means for farm implement cutter bars having an elongated arm pivotally mounted at one end thereof and joined to the cutter bar, there being an hydraulic system connected to the arm for swinging the same and disposed next adjacent to the point of pivot of the arm to the end that the cutter bar will respond quickly and travel relatively fast as compared with the speed of operation of the hydraulic system.

Other objects of the present invention relate to the way in which the swingable operating arm is pivotally connected to the cutter bar by means of an elongated rod; the way in which the hydraulic cylinder is itself pivotally mounted and has its reciprocating piston rod pivotally secured to the arm; and the manner of providing a shock absorbing means between the cutter bar and the arm to facilitate the above mentioned fast operation without undue wear and jar to the mechanism forming the subject matter hereof.

Figure 1:
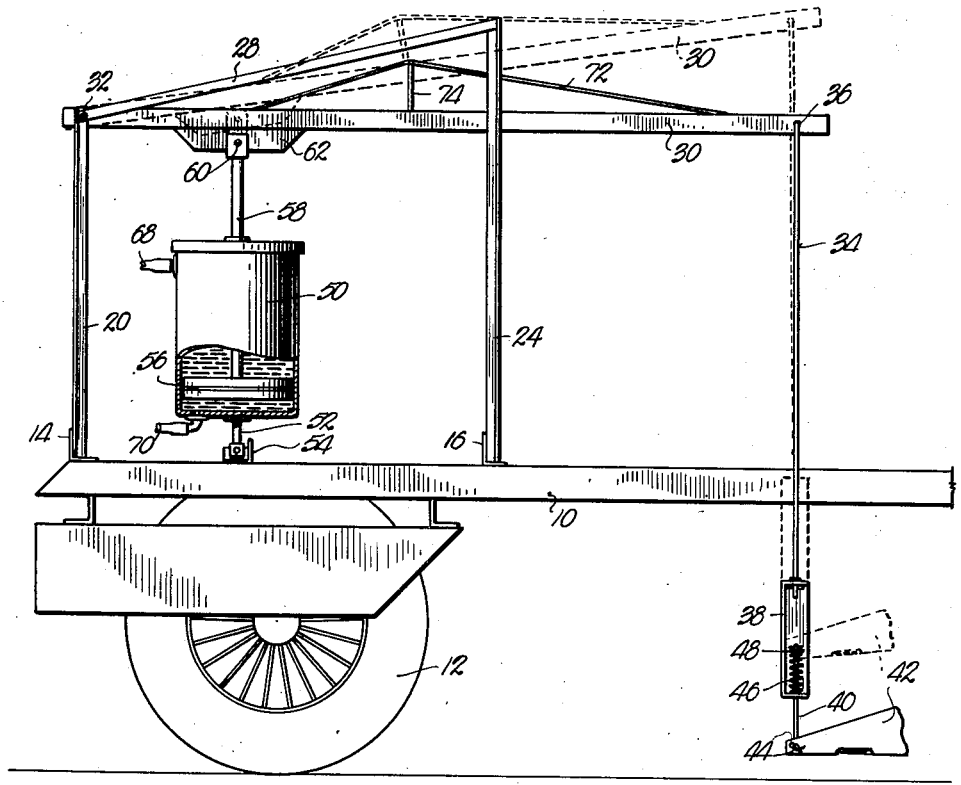
Figure 2:
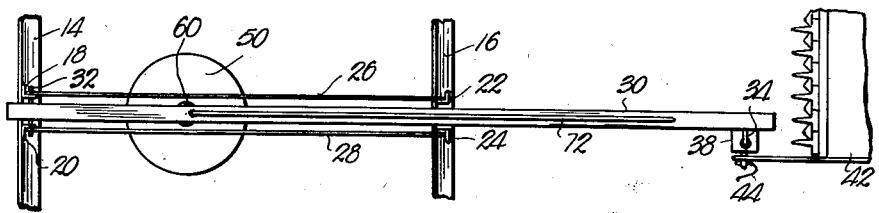

Other more minor objects will be made clear or become apparent as the following specification progresses, reference being had to the accompanying drawing, wherein:

Fig. 1 is a fragmentary elevational view showing schematically a part of a combine with which the hydraulic lift for cutter bars forming the subject matter hereof, is used and upon which the same is mounted; and Fig. 2 is a fragmentary top plan view of said portion of the combine showing the hydraulic lift mounted thereon.

Many attempts have heretofore been made to provide automatic means operable from a point remote from a cutter bar to raise and lower the same quickly and easily. All of such prior devices have been faulty however, because of the fact that oftentimes the cutter bar of a combine must be moved quickly as the implement moves along and thereupon again lowered with the same speed.

In normal operation of a combine or other cutting implement having a cutter bar, such cutter bar is normally disposed at a predetermined distance above the ground and is only raised when obstructions are met such as rocks, small knolls, ditches and the like. When the crop being cut is relatively thick and heavy, it is oftentimes difficult for the operator to notice the obstruction or irregularity in the terrain until the cutter bar is nearly upon such obstruction. It becomes desirable therefore, for the operator to be able to merely touch a manual control and be assured that the cutter bar will immediately respond and raise to a safe position. As soon as the obstruction is past, the operator should be able to again touch a manual control and the cutter bar will thereupon, lower to the normal operating position.

These and other objects form the subject matter of this invention and will become apparent as the following description progresses.

The framework of a combine or like implement is broadly designated by the numeral 10. This framework 10 is usually mobile through the medium of supporting wheel and axle assemblies 12.

The lifting assembly hereof includes framework comprising a pair of spaced apart horizontal cross bars 14 and 16 mounted in any suitable manner directly upon the framework 10 of the combine. A pair of upright spaced frame pieces 18 and 20 are joined at the lowermost ends directly to the cross member 14 and extend upwardly therefrom. Similarly, a pair of spaced apart frame pieces 22 and 24, having a length greater than the length of the frame pieces 18 and 20, are joined at their lowermost ends to the cross member 16 intermediate the ends of the latter and extend upwardly from member 16.

A pair of spaced, angularly disposed braces 26 and 28 are provided, the brace 26 interconnecting the frame pieces 18 and 22 while the brace 28 interconnects the uppermost ends of the frame pieces 20 and 24.

An elongated arm 30 is disposed between the frame pieces 18 and 20 and the frame pieces 22 and 24, and extends laterally beyond the frame pieces 22 and 24 opposite to the frame pieces 18 and 20. The width of the arm 30 is less than the distance between frame pieces 18 and 20 and frame pieces 22 and 24 and has one end thereof pivotally connected to the frame pieces 18 and 20 through the medium of a cross pin 32. That end of the elongated arm 30 opposite to the cross pin 32 has attached thereto an elongated rod 34, the uppermost end of the vertical rod 34 passing through an opening 36 in arm 30 whereby to afford pivotal connection between rod 34 and arm 30.

A shock absorbing box 38 receives the lowermost end of the rod 34. Box 38 has an opening in one end thereof opposite to the rod 34 for slidably receiving a short L-shaped rod 40. The short leg of the rod 40 is pivotally secured to one end of a cutter bar 42 and releasably held in place through the medium of a cotter key or the like 44.

A spring 46 is coiled about the uppermost end of the rod 40 within the box 38 and a suitable stop 48 on the uppermost end of rod 40, receives the proximal end of spring 46.

An hydraulic cylinder 50 is pivotally mounted at its lowermost end through the medium of a standard 52 upon a cross frame member 54 carried by the framework 10 and disposed between the cross members 14 and 16. Cylinder 50 is provided with a reciprocable piston 56 having a vertical reciprocable rod 58 extending outwardly above the uppermost end of the cylinder 50. The outermost free end of the piston rod 58 is pivotally secured as at 60 to a block 62, depending from and secured directly to the arm 30 next adjacent the pivot pin 32 therefor.

Cylinder 50 is supplied with hydraulic pressure from a suitable source (not shown) through the medium of supply lines 68 and 70, in communication with the cylinder 50 at opposite ends thereof.

The arm 30 is provided with an elongated brace 72 at its uppermost edge that is in turn supported by an upright member 74 extending upwardly from the arm 30 intermediate the ends of the brace 72.

In operation, when it is desired to raise the cutter bar 42 from a normal position, the operator actuates a valve (not shown) to direct hydraulic pressure beneath the reciprocable piston 56. Upward movement of piston 56 and its rod 58 swings arm 30 on its pivotal mounting 32 to in turn swing the rod 34 upwardly, all as indicated in dotted lines in Fig. 1. It is appreciated that the piston rod 58 travels a relatively short distance as compared with the over-all length of travel of rod 34 and the cutter bar 42 connected thereto. Consequently, as soon as hydraulic pressure is directed to the cylinder 50, the cutter bar will respond immediately and its speed of travel will be appreciably greater than the speed of travel of the piston 56 and its rod 58. No binding action of any kind will take place between the cylinder 50 and the cutter bar 42 because of the pivotal connection between the standard 52 and frame member 54, the pivotal connection 60 between rod 58 and block 62, the pivotal connection 32 between arm 30 and the frame pieces 18 and 20, the pivotal connection 36 between rod 34 and arm 30, and the pivotal connection between short rod 40 and the cutter bar 42.

It is apparent also, that the arm 30 will be guided throughout its path of travel by the vertical frame pieces 22 and 24, the latter of which may be further supported in any suitable manner not shown. To this end, it is contemplated that the frame pieces 18 and 20, as well as 22 and 24, may be held in predetermined, spaced relationship by suitable cross bars and may be provided with angled braces that additionally support the same against lateral displacement.

Such changes and modifications as fairly come within the scope of the appended claim are obviously contemplated hereby.

Having thus described the invention, what is claimed as new and desired to be secured by Letters Patent is:

Elevating and lowering mechanism for combine cutter bars, said mechanism comprising a pair of spaced, horizontal cross bars adapted for mounting on a combine; a pair of spaced, upstanding frame pieces secured to each cross bar respectively and interconnected at the uppermost ends thereof; an elongated, substantially horizontal arm pivotally mounted at one end thereof to one pair of said frame pieces therebetween and at the uppermost ends of the latter for swinging movement on its transverse, horizontal axis, said arm being slidable between the other pair of frame pieces intermediate the ends of the arm, said other pair of frame pieces extending above said one pair of frame pieces; a pivotally mounted hydraulic cylinder underlying the arm; a piston in the cylinder having an elongated stem disposed for vertical reciprocation on its longitudinal axis and pivotally joined to the arm near the said one end of the latter; an elongated rod depending from said arm at the opposite end thereof, said rod being pivotally joined to the arm, and the lowermost end of the rod being adapted for pivotal connection with a cutter bar to be raised and lowered, said rod including an uppermost and a lowermost section; an elongated member having a pair of ends, one end of the member being secured to the uppermost section, the other end of the member being slidable on the lowermost section; an out-turned shoulder on said lowermost section; and a spring coiled about said lowermost section between the shoulder and said other end of the member.

JOHN H. LINDAU.
ROBERT P. STEWART.
JOHN D. BLACK.

REFERENCES CITED

The following references are of record in the file of this patent:

UNITED STATES PATENTS

| Number | Name | Date |
|---|---|---|
| 2,187,833 | Locke et al. | Jan. 23, 1940 |
| 2,318,409 | Millard et al. | May 4, 1943 |
| 2,319,458 | Hornish | May 18, 1943 |
| 2,473,655 | Lohn | June 21, 1949 |
| 2,489,065 | Whited | Nov. 22, 1949 |